(12) United States Patent
Karesangannavar et al.

(10) Patent No.: US 10,288,045 B2
(45) Date of Patent: May 14, 2019

(54) SYSTEM AND METHOD FOR REPAIRING DENTS IN WIND TURBINE TOWER SECTIONS AND A RELATED DENT REPAIR TOOL

(71) Applicant: General Electric Company, Schenectady, NY (US)

(72) Inventors: Suneel Basavaraj Karesangannavar, Bangalore (IN); Biju Nanukuttan, Bangalore (IN); Narasimhamurthy Raju Nadampalli, Bangalore (IN); Chickballapur Venkatakrishnappa Raghunandan, Bangalore (IN); Vijaykumar Muppayya Hiremath, Bangalore (IN); Manjunath Basavanneppa Sampagavi, Bangalore (IN)

(73) Assignee: General Electric Company, Schenectady, NY (US)

( * ) Notice: Subject to any disclaimer, the term of this patent is extended or adjusted under 35 U.S.C. 154(b) by 482 days.

(21) Appl. No.: 14/976,478

(22) Filed: Dec. 21, 2015

(65) Prior Publication Data

US 2017/0175715 A1    Jun. 22, 2017

(51) Int. Cl.
*B21D 1/08* (2006.01)
*F03D 80/50* (2016.01)
(Continued)

(52) U.S. Cl.
CPC ............... *F03D 80/50* (2016.05); *B21D 1/08* (2013.01); *F03D 13/20* (2016.05); *B21D 3/16* (2013.01);
(Continued)

(58) Field of Classification Search
CPC ... B21D 1/06; B21D 1/08; B21D 1/10; B21D 3/00; B21D 3/16; B21D 3/10; B21D 3/14;
(Continued)

(56) References Cited

U.S. PATENT DOCUMENTS

| | | | | |
|---|---|---|---|---|
| 3,625,046 A | * | 12/1971 | Van Gompel | B21D 1/08 72/202 |
| 3,961,516 A | * | 6/1976 | Priester | B21D 51/14 72/370.08 |
| 4,238,951 A | * | 12/1980 | Grainger | B21D 1/14 269/114 |
| 4,549,423 A | * | 10/1985 | Masui | B21D 1/12 72/295 |

(Continued)

OTHER PUBLICATIONS

Picture of Wind Turbine Tower with Tower Bracing, (http://highhopesgardens.com/blog/2011/11/15/november-15-2011-at-a-wind-turbine-work-site/), Nov. 15, 2011.

*Primary Examiner* — Edward T Tolan
(74) *Attorney, Agent, or Firm* — Dority & Manning, P.A.

(57) ABSTRACT

A system for repairing dents in a wind turbine tower section may generally include a dent repair tool having a tool hub and a plurality of arms configured to extend radially outwardly from the tool hub towards an inner surface of the tower section. The tool may also include a linear actuator configured to linearly actuate a plunger of the actuator arm relative to the tool hub such that the plunger applies a radially outward force against the inner surface of the tower section at or adjacent to a location of a dent formed in the tower section. In addition, the system may include a load sensor configured to provide an indication of a load associated with the radially outward force applied against the inner surface of the tower section by the plunger and a controller configured to monitor the load based on signals received from the load sensor.

20 Claims, 10 Drawing Sheets

(51) Int. Cl.
*F03D 13/20* (2016.01)
*B21D 3/16* (2006.01)
*E04H 12/34* (2006.01)

(52) U.S. Cl.
CPC .......... *E04H 12/34* (2013.01); *F05B 2230/80* (2013.01); *F05B 2270/808* (2013.01); *F05B 2270/821* (2013.01); *Y02E 10/728* (2013.01); *Y02P 70/523* (2015.11)

(58) Field of Classification Search
CPC ..... B21D 41/02; F03D 80/50; F05B 2270/80; F05B 2270/804; F05B 2270/8041; F05B 2270/808
See application file for complete search history.

(56) References Cited

U.S. PATENT DOCUMENTS

| | | | |
|---|---|---|---|
| 6,592,331 B1 | 7/2003 | Wobben | |
| 6,684,677 B1 * | 2/2004 | Bar | B21D 1/06 |
| | | | 72/342.1 |
| 7,967,550 B2 | 6/2011 | Grevsen et al. | |
| 8,245,558 B2 | 8/2012 | Barr | |
| 8,353,106 B2 * | 1/2013 | Lasser | B21D 1/08 |
| | | | 29/894.35 |
| 8,570,319 B2 | 10/2013 | van Baar et al. | |
| 2006/0196244 A1 * | 9/2006 | Neubauer | B21D 1/08 |
| | | | 72/705 |
| 2011/0176904 A1 | 7/2011 | Stiesdal | |
| 2014/0208816 A1 * | 7/2014 | Nakashima | B21D 3/14 |
| | | | 72/18.9 |

* cited by examiner

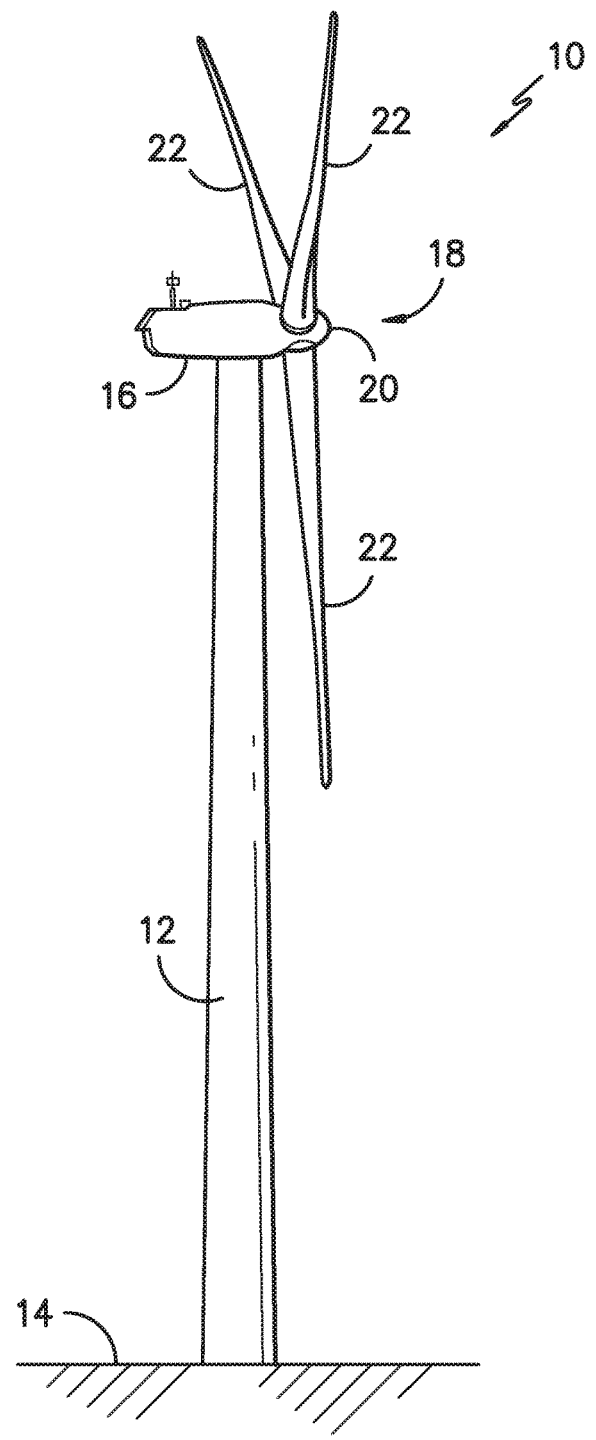
FIG. -1-

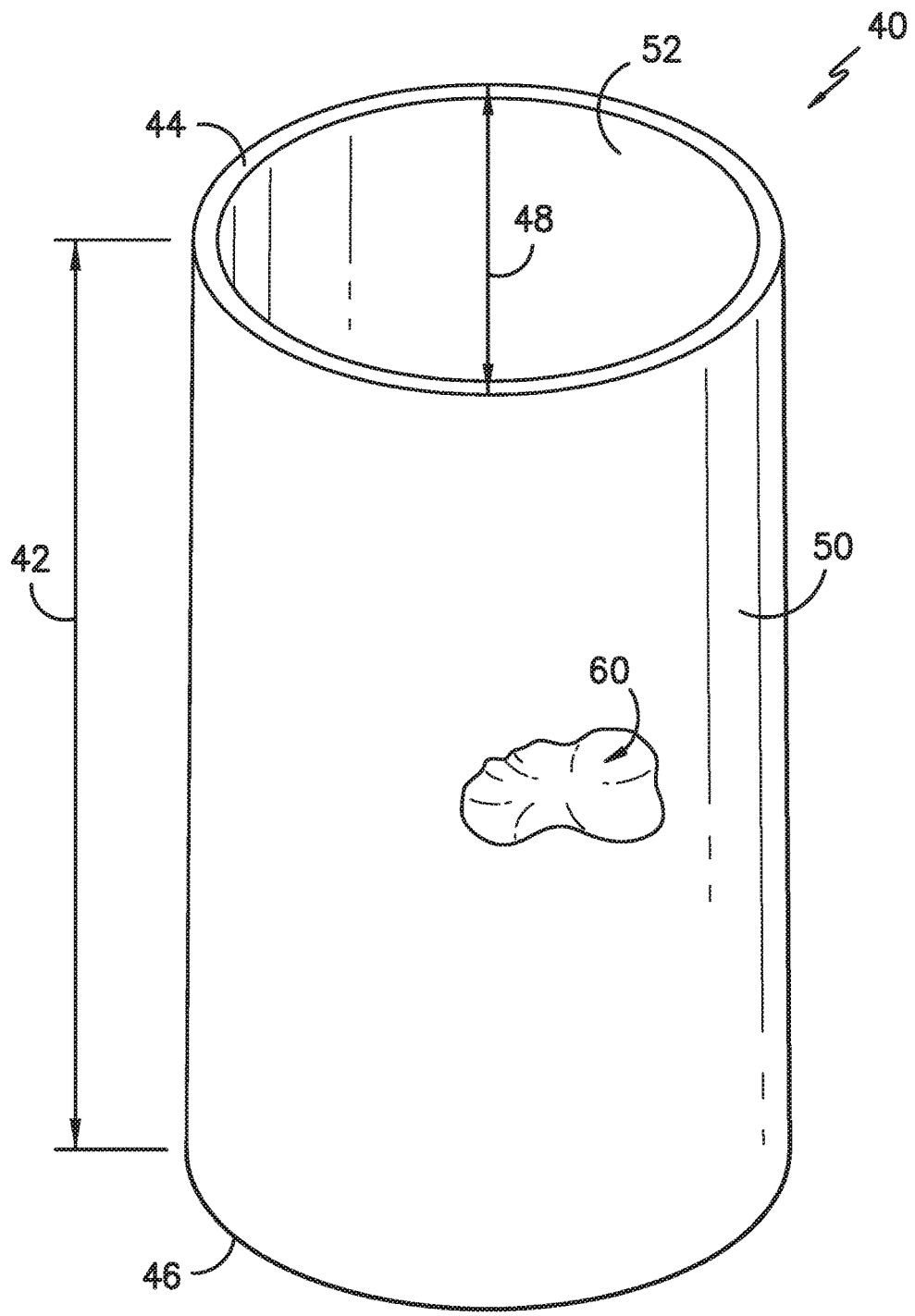
FIG. -2-

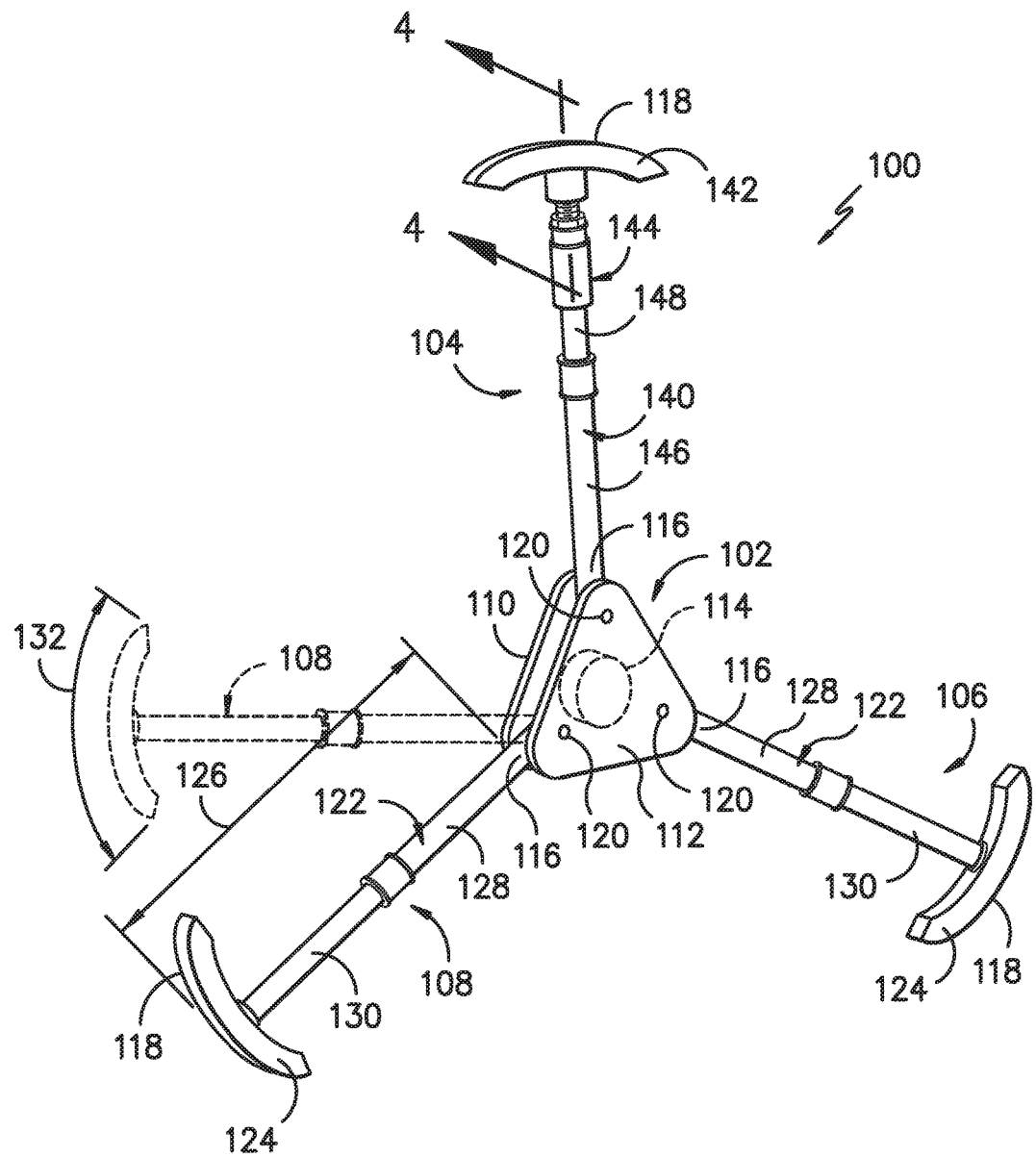
FIG. -3-

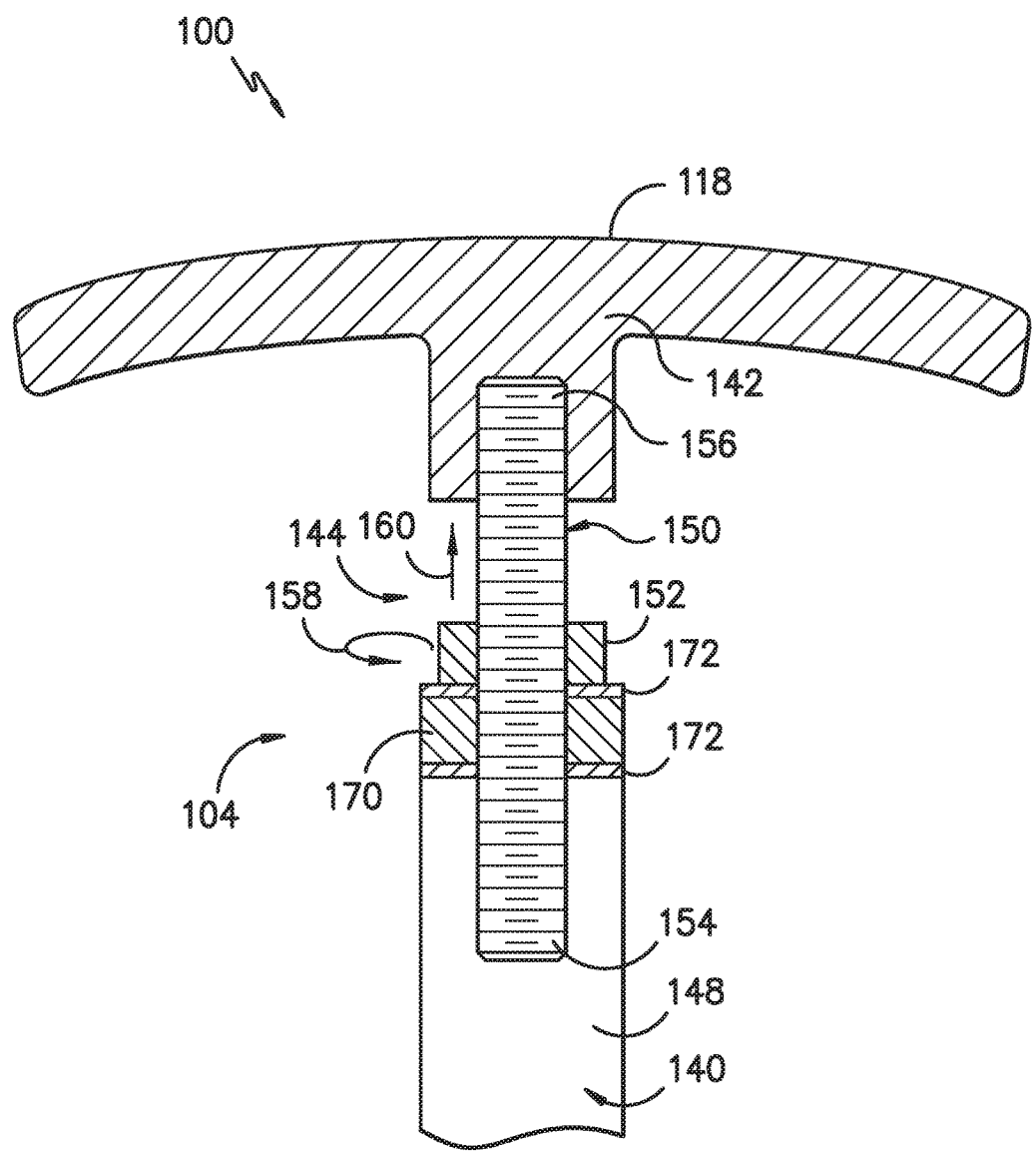
FIG. -4-

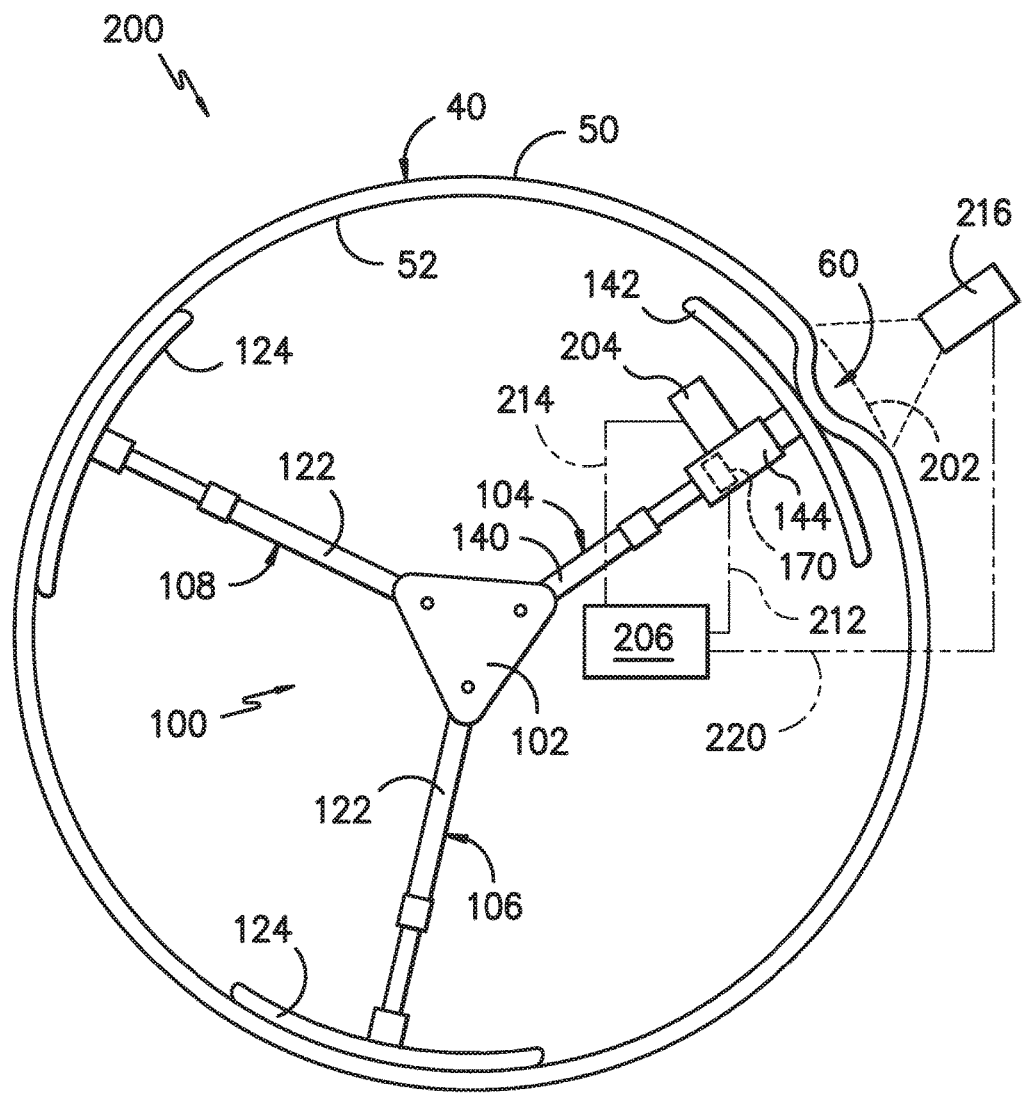
FIG. -5-

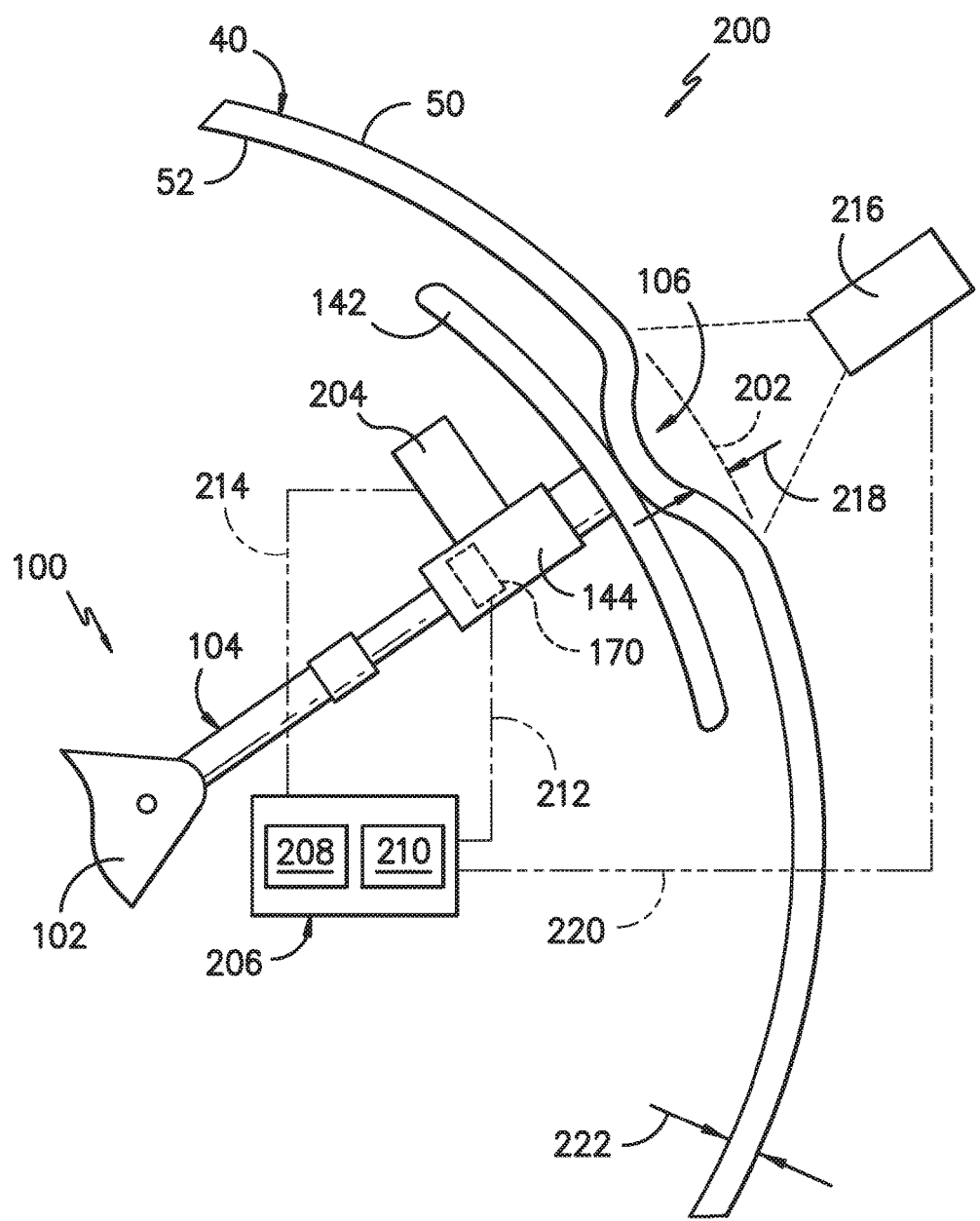
FIG. -6-

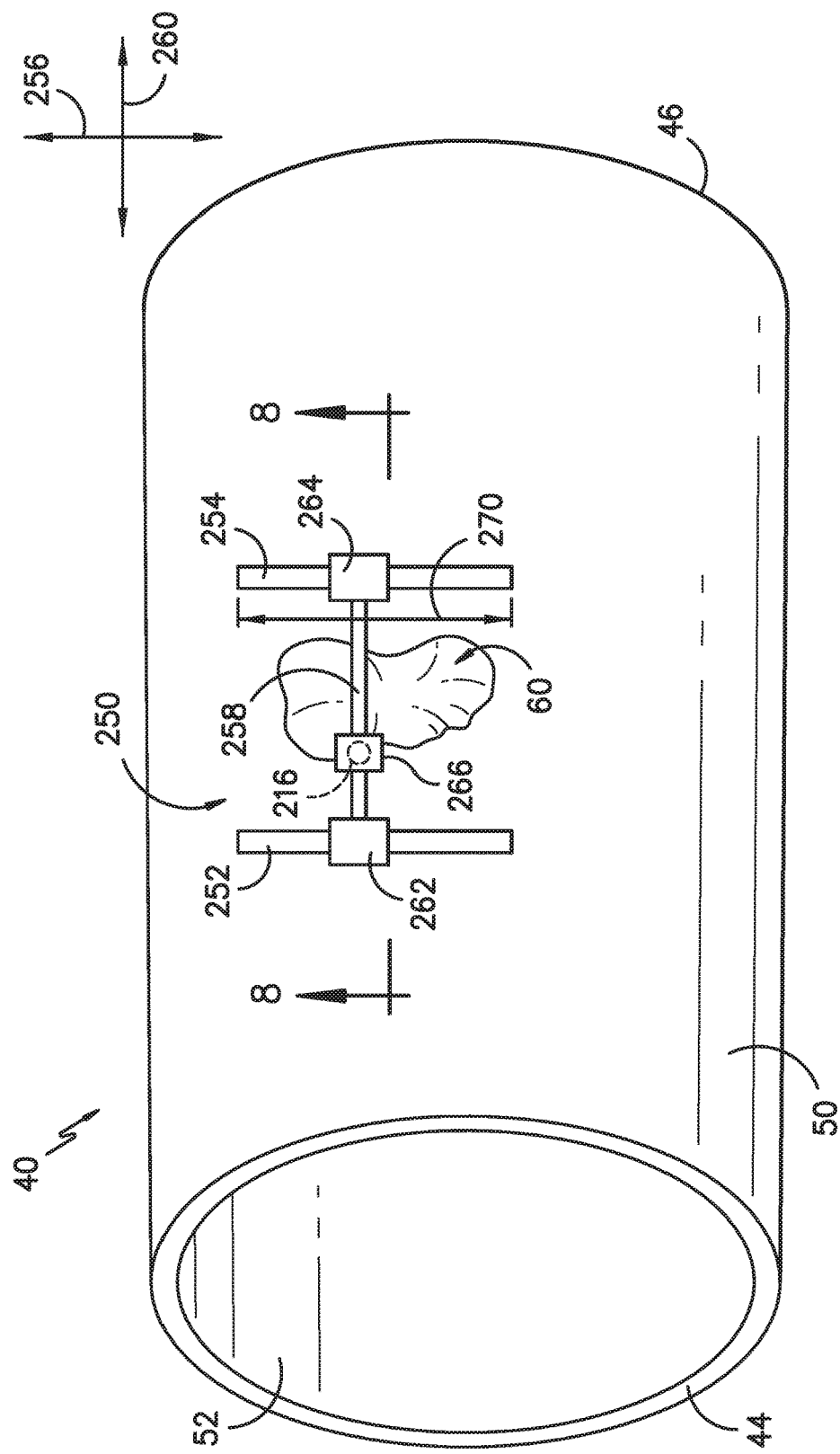

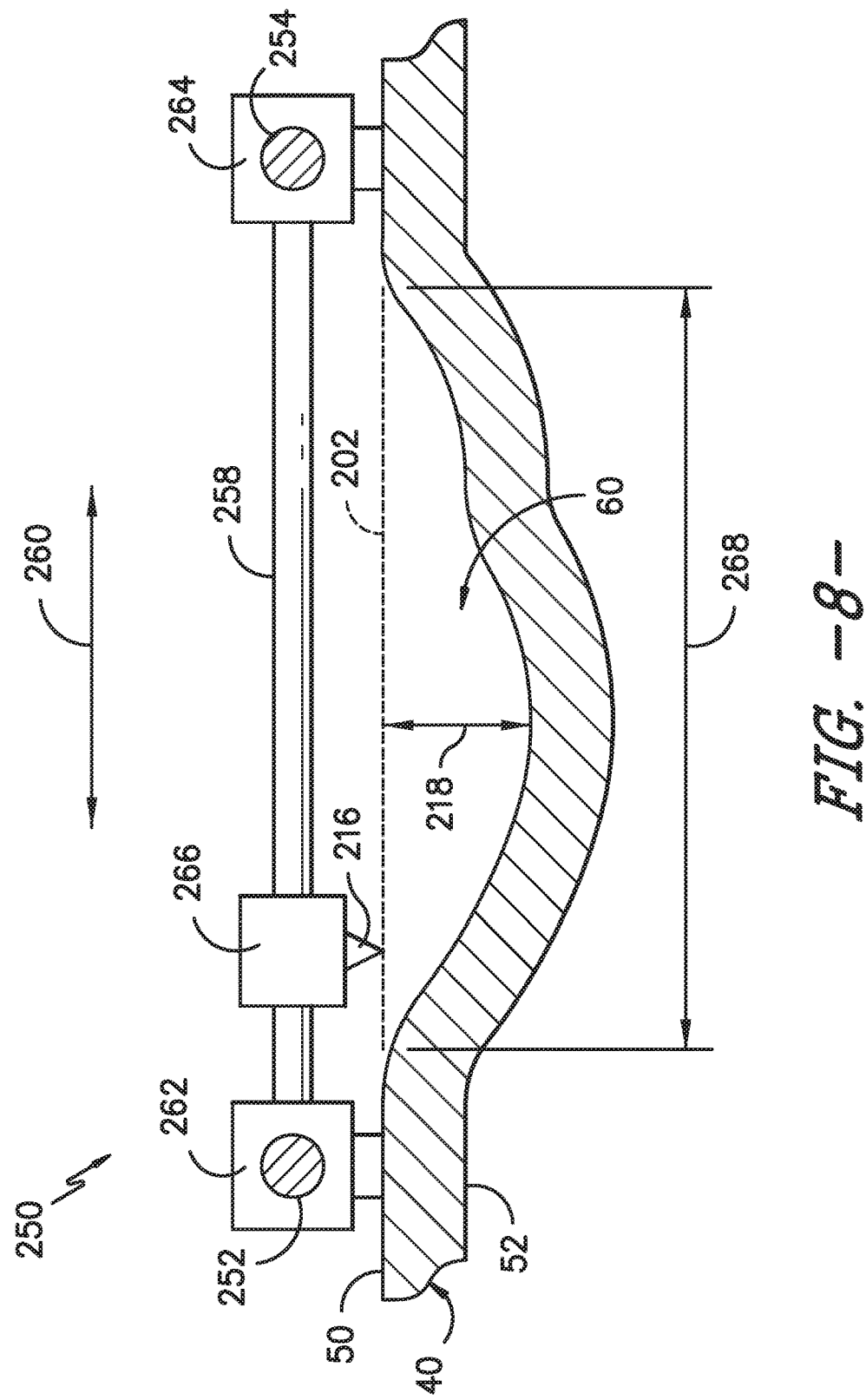
FIG. -8-

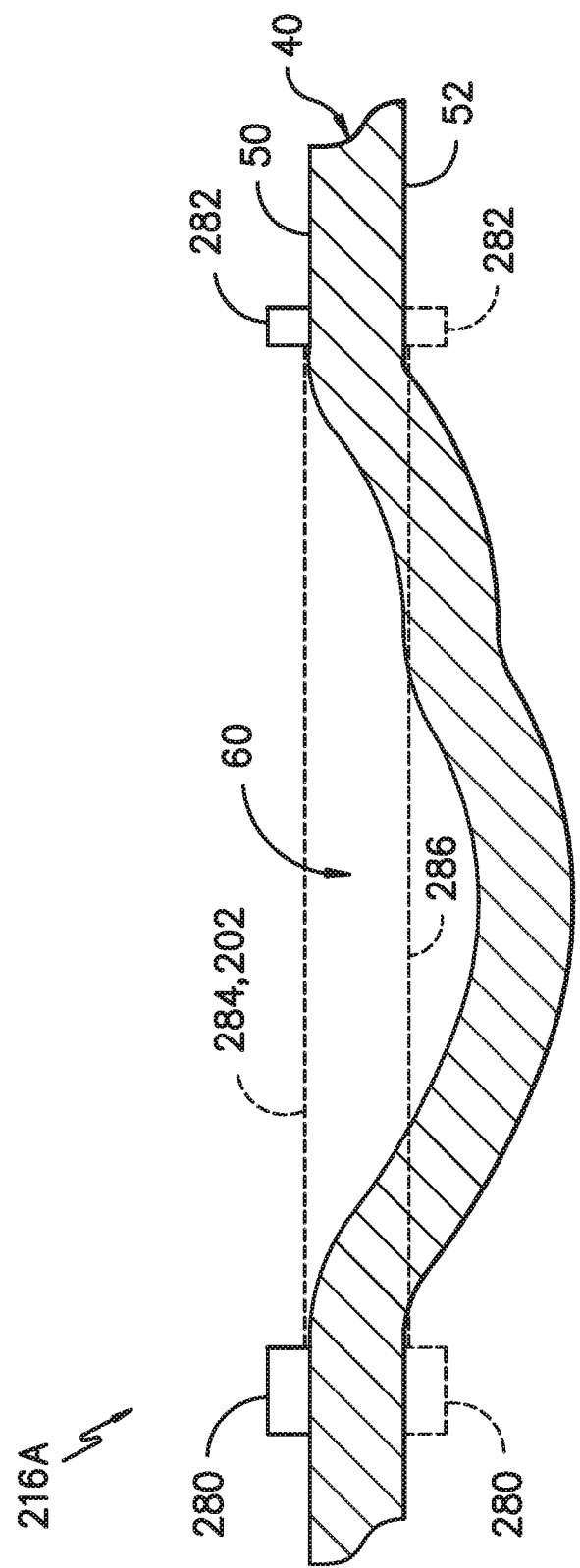

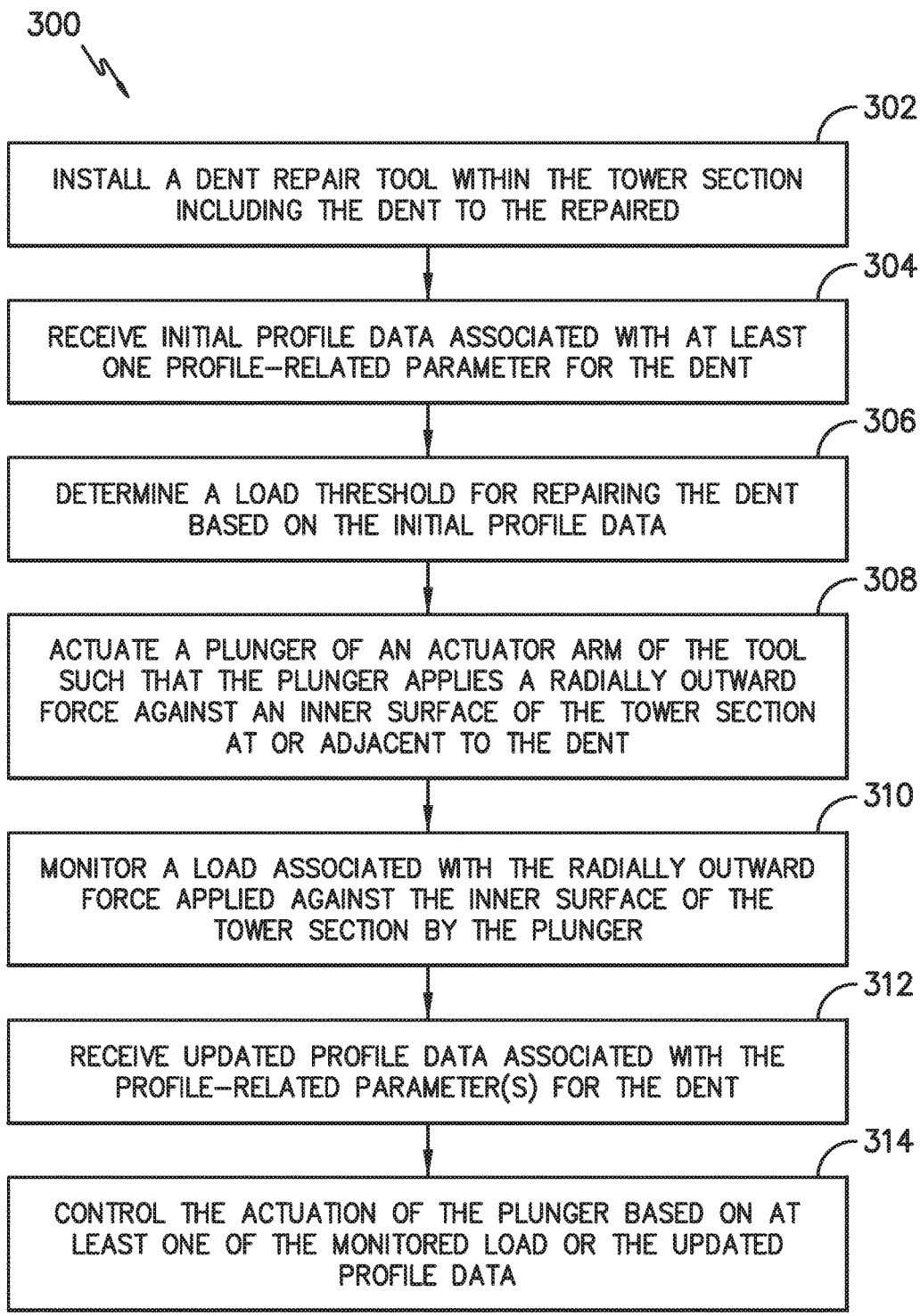
FIG. -10- ial # SYSTEM AND METHOD FOR REPAIRING DENTS IN WIND TURBINE TOWER SECTIONS AND A RELATED DENT REPAIR TOOL

FIELD OF THE INVENTION

The present subject matter relates generally to wind turbines and, more particularly, to a system and method for repairing dents in wind turbine tower sections and a related dent repair tool.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many instances, a wind turbine tower is formed from an assembly of individual tower segments or sections. For example, a plurality of unassembled tower sections may be transported to the proposed site of the wind turbine. The individual tower sections may then be stacked on one top of the other so as to form a hollow structure extending between the base of the wind turbine and the nacelle.

Due to an incident occurring during transport of the tower sections to the field and/or due to mishandling of the tower sections prior to or following transport to the field, a tower section may become dented at one or more locations along its outer circumference. For example, a portion of the tower section may be dented inwardly relative to the outer circular profile of the tower section. In such instance, to prevent the inwardly extending dent from forming a weak spot or buckling point for the tower being assembled, it is common practice to attempt to repair the dent. In this regard, dent repair systems are known that are designed to repair the dent by pushing the dent outwardly from the interior of the tower section. However, such conventional dent repair systems are often difficult to install within the tower section and/or do not provide adequate mechanical support for the system components as the dent is being pushed outwardly. In addition, dent repair systems to date correspond to open-loop or non-feedback systems. As a result, conventional dent repair systems lack the ability to provide for an actively controlled dent repair process.

Accordingly, an improved system and method for repairing a dent formed in a wind turbine tower section, as well as a related dent repair tool, would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for repairing dents in a tower section of a wind turbine tower. The system may generally include a dent repair tool configured to be installed within the tower section. The tool may include a tool hub and a plurality of arms configured to extend radially outwardly from the tool hub towards an inner surface of the tower section. The tool may also include a linear actuator provided in operative association with an actuator arm of the plurality of arms, wherein the linear actuator is configured to linearly actuate a plunger of the actuator arm relative to the tool hub such that the plunger applies a radially outward force against the inner surface of the tower section at or adjacent to a location of a dent formed in the tower section. In addition, the system may include a load sensor configured to provide an indication of a load associated with the radially outward force applied against the inner surface of the tower section by the plunger and a controller configured to monitor the load based on signals received from the load sensor.

In another aspect, the present subject matter is directed to a method for repairing dents in a tower section of a wind turbine tower. The method may generally include installing a dent repair tool within the tower section. The tool may include a tool hub and a plurality of arms extending radially outwardly from the tool hub towards an inner surface of the tower section. The tool may also include a linear actuator provided in operative association with an actuator arm of the plurality of arms. Additionally, the method may include actuating a plunger of the actuator arm via the linear actuator such that the plunger applies a radially outward force against the inner surface of the tower section at or adjacent to a dent formed in the tower section and monitoring a load associated with the radially outward force applied against the inner surface of the tower section by the plunger.

In a further aspect, the present subject matter is directed to a tool for repairing dents in a tower section of a wind turbine. The tool may generally include a tool hub and first and second support arms coupled to the tool hub so as to extend radially outwardly therefrom. The tool may also include an actuator arm configured to extend radially outwardly from the tool hub between a first end and a second end. The actuator arm may include an arm base coupled to the tool hub at the first end and a plunger disposed at the second end of the actuator arm. The actuator arm may also include a linear actuator coupled between the arm base and the plunger. When the tool is installed within the tower section, the linear actuator is configured to linearly actuate the plunger relative to the tool hub such that the plunger applies a radially outwardly force against an inner surface of the tower section at or adjacent to a location of a dent formed in the tower section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine in accordance with aspects of the present subject matter;

FIG. 2 illustrates a perspective view of one embodiment of a tower section that may be used to form part of a wind turbine tower in accordance with aspects of the present subject matter, particularly illustrating a dent formed in the tower section;

FIG. 3 illustrates a perspective view of one embodiment of a dent repair tool in accordance with aspects of the present subject matter;

FIG. 4 illustrates a cross-sectional view of the dent repair tool shown in FIG. 3 taken about line 4-4;

FIG. 5 illustrates a top view of one embodiment of a system for repairing dents formed in a tower section of a wind turbine tower in accordance with aspects of the present subject matter, particularly illustrating various components of the system being installed within and/or relative to the tower section shown in FIG. 2;

FIG. 6 illustrates a top view of a portion of the system and tower section shown in FIG. 5;

FIG. 7 illustrates the tower section shown in FIG. 2 having one embodiment of a sensor assembly installed thereon for obtaining profile data associated with the dent formed in the tower section in accordance with aspects of the present subject matter;

FIG. 8 illustrates a cross-sectional view of a portion of the tower section and sensor assembly shown in FIG. 7 taken about line 8-8;

FIG. 9 illustrates a similar cross-sectional view of the portion of the tower section shown in FIG. 8, particularly illustrating an embodiment of a profile sensor configured to be installed relative to the tower section for obtaining profile data associated with the dent formed in the tower section in accordance with aspects of the present subject matter; and FIG. 10 illustrates a flow diagram of one embodiment of a method for repairing dents within a tower section of a wind turbine tower in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for repairing dents in a tower section of a wind turbine tower. Specifically, in several embodiments, the system may include a dent repair tool configured to be installed within the interior of the tower section. The tool may generally include a central hub and a plurality of arms extending radially outwardly from the tool hub such that a radially outer end of each arm contacts an inner wall or surface of the tower section. For example, as will be described below, the tool may include three arms extending radially outwardly from the tool hub, with each arm being configured to contact the inner surface of the tower. In accordance with aspects of the present subject matter, at least one of the arms may correspond to an actuator arm and, thus, may include a linear actuator incorporated therein that is configured to actuate a portion of the arm radially outwardly such that the arm applies an outward force against the tower section. Thus, by aligning the actuator arm with an inwardly extending dent formed in the tower section, the actuator arm may be used to apply an outward force against the tower section that pushes the dent outwardly into alignment with the normal profile of the tower section.

In several embodiments, the linear actuator may correspond to a rotationally driven actuator configured to convert rotational motion into linear motion. For instance, the linear actuator may correspond to a screw-type actuator configured to provide linear actuation based on the engagement between corresponding male and female threaded members. Specifically, in one embodiment, the linear actuator may include a threaded rod (e.g., a bolt or lead screw) and a threaded nut (e.g., a drive nut) configured to rotationally engage the threaded rod. In such an embodiment, by rotating the threaded nut (e.g., via any suitable rotational driver device or means), the threaded rod may be linearly actuated so as to force the actuator arm against the dent formed in the tower section.

Additionally, in accordance with aspects of the present subject matter, the system may also include a controller configured to control the linear actuation of the actuator arm against the inner surface of the tower section based on feedback received from one or more sensors. Specifically, in several embodiments, the controller may be configured to control the actuation of the actuator arm so as to actively control the load applied to the tower section. For example, the controller may be communicatively coupled to a load sensor configured to provide an indication of the load being applied to the tower section by the actuator arm. Thus, by monitoring the load applied to the tower section via the signals provided by the load sensor, the controller may be configured to actively adjust the actuation of the actuator arm, thereby allowing the controller to control the load applied to the tower section. For example, when the linear actuator is configured to be driven by a rotational driver device, the controller may be configured to control the operation of the driver device (e.g., by adjusting the speed and/or torque output of the driver device) in order to control the load applied to the tower section.

Moreover, in several embodiments, the system may also include one or more profile sensors configured to detect one or more profile-related parameters associated with the dent being repaired. In a particular embodiment, the profile sensor may correspond to a sensor configured to detect the depth of the dent formed in the tower section from a location external to the tower section. For example, the profile sensor may correspond to an optics-based or proximity-based scanner that is configured to scan the exterior surface of the tower section so as to detect the depth of the dent at one or more locations. This information may then be transmitted to the controller to assist the controller in controlling the actuation of the actuator arm as the dent is being pushed into alignment with the remainder of the tower section. For instance, the dent may be scanned prior to the initiation of the repair so as to obtain initial depth information, which may be used by the controller to determine the load to be applied against the tower section when repairing the dent. Similarly, updated depth information may also be obtained while the dent is being pushed outwardly to provide the controller feedback on the progress of the dent repair.

Referring now to the drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

In several embodiments, the tower 12 may be constructed from a plurality of tower sections configured to be stacked on one top of the other so as to form a hollow structure extending between the support surface 14 of the wind turbine 10 and the nacelle 16. A perspective view of one embodiment of a tower section 40 that may be used to form a wind turbine tower 12 is illustrated in FIG. 2. As shown, the tower section 40 may generally define a height 42 extending between a top end 44 and a bottom end 46. In addition, the tower section 40 may generally define a circular cross-sectional shape. In one embodiment, the tower section 40 may have cylindrical shape defining a constant diameter 48. Alternatively, the tower section 40 may have a conical shape such that a decreasing diameter 48 is defined along the tower section 40 between its bottom end 46 and its top end 44. Additionally, as shown in FIG. 2, the tower section 40 may include an outer surface 50 defining the outer diameter or outer circular profile of the tower section 40 and an inner surface 52 defining the inner diameter or inner circular profile of the tower section 40.

As indicated above, a tower section may become dented at one or more locations during transport and/or handling thereof. For instance, as shown in FIG. 2, a dented area or dent 60 is present in the tower section 40 that projects or extends inwardly relative to the outer profile of the tower section 40. To prevent the dent 60 from forming a weak spot or buckling point for the tower 12, it may be desirable to repair the dent 60 by pushing the dented area outwardly from the interior of the tower section 40. As will be described below, the disclosed system and method, along with the disclosed dent repair tool, may be used to effectively and efficiently repair dents formed in a given tower section.

Referring now to FIGS. 3 and 4, several views of one embodiment of a dent repair tool 100 are illustrated in accordance with aspects of the present subject matter. Specifically, FIG. 3 illustrates a perspective view of the tool 100 and FIG. 4 illustrates a cross-sectional view of tool 100 shown in FIG. 3 taken about line 4-4.

As shown in FIG. 3, the tool 100 may generally include a central tool hub 102 and a plurality of arms 104, 106, 108 configured to extend radially outwardly from the hub 102. The tool hub 102 may generally form the central structural component or base for the tool 100. As shown in FIG. 3, in one embodiment, the tool hub 102 may include first and second hub plates 110, 112 separated from one another by a central hub member 114 (indicated by dashed lines) extending between the opposed plates 110, 112. In other embodiments, the tool hub 102 may have any other suitable configuration and/or may include any other suitable component(s) that allows the hub 102 to function as described herein.

As shown in the illustrated embodiment, the tool 100 includes three arms 104, 106, 108 configured to extend radially outwardly from the tool hub 102, with one of the arms being configured as an actuator arm 104 and the other two arms being configured as support arms (e.g., a first support arm 106 and a second support arm 108). As will be described below, a portion of the actuator arm 104 may be configured to be linearly actuated against the inner surface 52 of the tower section 40 within which the tool 100 is installed, thereby allowing a dent 60 formed in the tower section 40 to be pushed outwardly or otherwise repaired. Similarly, the support arms 106, 108 may be configured to provide structural support for the tool 100 as the actuator arm 104 is being used to push the dent 60 outwardly.

It should be appreciated that, although the dent repair tool 100 is illustrated herein as including a single actuator arm 104, the tool 100 may, instead, have a configuration in which two of its arms correspond to actuator arms 104 or all of its arms correspond to actuator arms 104. In such embodiments, the actuator arms may also be configured to function as support arms when not being used directly to push out a dent.

Each arm 104, 106, 108 may generally be configured to extend radially between a first end 116 coupled to the tool hub 102 and a second end 118 positioned opposite the first end 116. In several embodiments, the first end 116 of each arm 104, 106, 108 may be pivotally coupled to the tool hub 102 (e.g., via a pin 120 extending through each arm between the first and second hub plates 110, 112) to allow the arm to be rotated or repositioned relative to the hub 102. Such a pivotal connection between the tool hub 102 and each arm 104, 106, 108 may allow the circumferential spacing between the arms to be adjusted. For instance, as shown by the dashed lines associated with the second support arm 108, each arm 104, 106, 108 may be pivoted about its respective pin 120 to adjust the arm's circumferential positioning, which may allow the arms to be repositioned within the tower section 40 when needed to avoid internal tower components (e.g., ladders, cables, etc.). In addition, the pivotal connection may also allow for the arms 104, 106, 108 to be moved into a closed position (e.g., where both of the support arms 106, 108 are pivoted to a circumferential location directly adjacent to the actuator arm 104), which may allow the tool 100 to be easily transported and/or stored for subsequent use.

As shown in FIG. 3, each of the support arms 106, 108 may include an arm base 122 generally extending lengthwise between the first and second ends 116, 118 of each support arm 106, 108 and a support plunger 124 coupled to the arm base 112 at the second end 118 of the support arm 106, 108. In general, the arm base 122 of each support arm 106, 108 may be configured to extend radially outwardly from the tool hub 102 a given length 126 such that the support plunger 124 engages or otherwise contacts the inner surface 52 of the tower section 40 when the tool 100 is installed within the tower section 40. In several embodiments, the length 126 of the arm base 122 may be adjustable to allow the tool 100 to be installed within tower sections of differing diameters. For instance, as shown in the illustrated embodiment, the arm base 122 of each support arm 106, 108 may be configured as a telescoping assembly that allows the length 126 of the arm base 122 to be increased or decreased as necessary or desired. Specifically, as shown in FIG. 3, the arm base 122 of each support arm 106, 108 may include a first base portion 128 and a second base portion 130 configured to be at least partially received within the first base portion 128 to provide telescoping functionality to the arm base 122. As such, by adjusting the amount of the second base portion 130 that is received within the first base portion 128, the length 126 of each arm base 122 may be increased or decreased.

As indicated above, the support plunger 124 of each support arm 106, 108 may generally be configured to engage or contact the inner surface 52 of the tower section 40 to provide structural support to the tool 100 as the actuator arm 104 is being used to push out the dent 60 formed in tower section 40. For instance, by engaging the inner surface 52 of the tower section 40, a reactant force may be applied at the interface between the support plunger 124 and the tower section 40 as the actuator arm 104 is pushed against the dent 60. As shown in FIG. 3, in several embodiments, each support plunger 124 may define a curved or radiused profile (e.g., with a constant or varying radius of curvature) that is configured to generally match or conform to the inner circular profile of the tower section 40. As such, when the tool 100 is installed within the tower section 40, each support plunger 124 may engage or contact the inner surface 52 of the tower section 40 along at least a portion of a circumferential length 132 defined by the support plunger 124.

As shown in FIG. 3, the actuator arm 104 may be configured similarly to the support arms 106, 108. For instance, the actuator arm 104 may include an arm base 140 generally extending lengthwise between the first and second ends 116, 118 of the actuator arm 104 and an actuatable plunger 142 (hereinafter referred to simply as the "plunger 142" of the actuator arm 104) positioned at the second end 118 of the actuator arm 104. However, unlike the support arms 106, 108 described above, the actuator arm 104 may also include a linear actuator 144 coupled between the arm base 140 and the plunger 142. The linear actuator 144 may generally be configured to linearly actuate the plunger 142 such that the plunger 142 applies a radially outward force against the dent 60 to be repaired in the tower section 40, thereby pushing the dent 60 outwardly into alignment with the remainder of the tower section 40.

It should be appreciated that the arm base 140 of the actuator arm 104 may be configured the same as or similar to the arm base 122 of each of the support arms 106, 108. For instance, as shown in FIG. 3, the arm base 140 for the actuator arm 104 may, in one embodiment, include a first base portion 146 and a second base portion 148 provided in a telescoping configuration to allow the length of the arm base 140 to be adjusted as necessary or desired. Similarly, the plunger 142 of the actuator arm 104 may be configured the same as or similar to the support plungers 124 described above. For instance, the plunger 142 may be configured to contact or otherwise engage the inner surface 52 of the tower section 40 (particularly at or adjacent to the location of the dent 60). As such, the plunger 142 may define a curved or radiused profile (e.g., with a constant or varying radius of curvature) to allow the plunger 142 to at least partially engage the inner circular profile of the tower section 40.

It should be appreciated that, in several embodiments, the support plungers 124 and/or the plunger 142 may be configured to be removably coupled to their respective arms 104, 106, 108. In such embodiments, the plungers 124, 142 may be removed from the tool 100, as desired, and replaced with plungers have differing configurations. For example, an inventory of interchangeable plungers may be available for use with the tool 100 that are configured to accommodate differing tower profiles (e.g., inner circular profiles defining differing radii of curvature) and/or differing dent profiles (e.g., differing depths, widths, etc.). As such, the support plungers 124 and/or the plunger 142 may be selected from the inventory of plungers based on the specific configuration of the tower section 40 being repaired and/or the specific profile of the dent 60 being repaired.

In general, the linear actuator 144 of the actuator arm 104 may correspond to any suitable actuator or actuating device that is configured to linearly actuate the plunger 142 in the radial direction, such as a hydraulic, pneumatic or solenoid-activated piston and/or the like. However, in several embodiments, the linear actuator 144 may correspond to a rotationally driven actuator that is configured to convert rotational motion into linear motion. For instance, as shown in FIG. 4, the linear actuator 144 is configured as a screw-type actuator including a threaded rod 150 (e.g., a bolt or other threaded member) and a corresponding threaded nut 152 configured rotationally engage the threaded rod 150. Specifically, as shown in the illustrated embodiment, the threaded rod 150 may be configured to extend between a first end 154 and a second end 156, with the first end 154 being rotatably coupled to the arm base 140 of the actuator arm 104 and the second end 156 being rigidly coupled to the plunger 152. In such an embodiment, by rotating the nut 152 in a given direction (e.g., indicated by arrow 158 in FIG. 4), the threaded member 150 may be moved linearly along the rotational axis of the nut 152 in a radially outward direction (e.g., as indicated by arrow 160 in FIG. 4), thereby linearly actuating the plunger 142 in such outward direction. Similarly, by rotating the nut 152 in the opposite direction, the threaded member 150 may be moved linearly along the rotational axis of the nut 152 in a radially inward direction, thereby linearly actuating the plunger 142 in such inward direction.

It should be appreciated that, as an alternative to configuring the linear actuator 144 as a screw-type actuator in which the threaded rod 150 is linearly driven by rotation of the threaded nut 152, the linear actuator 144 may, instead, be configured such that the threaded nut 152 is linearly driven by rotation of the threaded rod 150. In such an embodiment, the threaded nut 152 may be coupled to the plunger 142 such that, as the threaded rod 150 is rotated, the threaded nut 152 (and, thus, the plunger 142) is linearly actuated in the radial direction. It should also be appreciated that, in other embodiments, the linear actuator 144 may have any other suitable configuration and/or may include any other suitable component(s) that allows the actuator 144 to convert rotational motion into linear motion. For instance, in one embodiment, the linear actuator 144 may be configured as a worm gear-type actuator or a rack and pinion-type actuator.

Additionally, in several embodiments, the tool 100 may include one or more sensors 170 provided in operative association with the actuator arm 104 that are configured to provide an indication of the load applied against the tower section 40 as the plunger 142 is being actuated outwardly. For example, as shown in FIG. 4, in one embodiment, a load sensor 170 may be provided in operative association with the linear actuator 144, such as by positioning the load sensor 170 on the threaded member 150 at a location between the arm base 140 and the threaded nut 152 such that the load sensor 170 is compressed between such components as the threaded nut 152 is rotated in order to linearly actuate the plunger 142. In such an embodiment, washers 172 (e.g., hardened washers) may be placed along either side of the donut-shaped load sensor 170 to enhance load transfer to the sensor 170. The load sensor 170 may then detect the compressive load applied between the threaded nut 152 and the arm base 140, which may provide an indication of the outward force being applied to the inner surface 52 of the tower section 40 as the plunger 142 is being actuated radially outwardly.

In other embodiments, the load sensor 170 may be located at any other suitable location that allows the sensor 170 to provide an indication of the load being applied to the tower section 40 via the actuator arm 104, such as by incorporating the load sensor into the plunger 142 and/or the arm base 140 of the actuator arm 104. Additionally, it should be appreciated that that the load sensor 170 may generally correspond to any suitable sensor configured to detect a load or force applied through the actuator arm 104 that is indicative of the load or force being applied to the tower section 40 as the plunger 142 is being actuated radially outwardly. For instance, a torque sensor associated with the threaded nut 152 may be configured to detect the torque that must be applied to the nut 152 in order to linearly actuate the plunger 142, which may provide an indication of the load being applied to the tower section 40 by the plunger 142.

Referring now to FIGS. 5 and 6, top-down, schematic views of one embodiment of a system 200 for repairing dents in a tower section of a wind turbine tower is illustrated in accordance with aspects of the present subject matter. Specifically, FIG. 5 illustrates a cross-sectional view of the tower section 40 shown in FIG. 2, with various components of the disclosed system 200 being installed within and/or relative to the tower section 40. Additionally, FIG. 6 illustrates a close-up view of a portion of the tower section 40 and system 200 shown in FIG. 5.

In general, the system 200 may include a dent repair tool, such as the tool 100 described above with reference to FIGS. 3 and 4. As shown in FIG. 5, the tool 100 may be configured to be installed within the interior of the tower section 40. Specifically, in several embodiments, the tool 100 may be initially installed within the tower section 40 by adjusting the lengths of each arm base 122, 140 (e.g., via the telescoping functionality) such that the plunger 142 of the actuator arm 104 contacts or otherwise engages the inner surface 52 of the tower section 40 at a location at or adjacent to the dent 60 to be repaired and the support plungers 124 contact or otherwise engage the inner surface 52 of the tower section 40 at separate locations spaced apart circumferentially from the location of the dent 60. As described above, the plunger 142 of the actuator arm 104 may then be actuated radially outwardly via the linear actuator 144 such that the plunger 142 applies an outward force against the tower section 40 that pushes the dent 60 back into alignment with the remainder of the tower section 40. For instance, the plunger 142 may be used to push the dent 60 outwardly until the dented portion of the tower section 60 is aligned with a reference line 202 defining the outer circular profile of the tower section 40.

It should be appreciated that, when installing the tool 100 within the tower section 40, the orientation of the plunger 142 may be adjusted, as desired or as is necessary, relative to the dent 60 being repaired based on the dent's profile. For example, plunger 142 may be rotated about the lengthwise axis or direction of the actuator arm 104 to adjust the orientation of the plunger relative to the dent 60.

Additionally, as shown in FIGS. 5 and 6, the system 200 may also include a driver device 204 configured to drive the linear actuator 144 such that the plunger 142 may be actuated radially outwardly relative to the tool hub 102. In general, the driver device 204 may correspond to any suitable device(s) and/or other component(s) that is configured to drive the linear actuator 144. For example, when the linear actuator 144 corresponds to a rotationally driven actuator, the driver device 204 may correspond to any suitable device(s) that is configured to apply a torsional force against the rotating component of the linear actuator 144 (e.g., the threaded nut 152) to allow the linear actuator 144 to convert the rotational motion of such rotating component to linear motion (e.g., the corresponding radial motion of the threaded rod 150). For instance, the driver device 204 may be any suitable pneumatic-based, hydraulics-based or electrical-based torque application mechanism, such as a hydraulic or pneumatic torque wrench. Alternatively, the driver device 204 may correspond to a manual torque application mechanism, such as a manually actuated torque wrench.

Moreover, in several embodiments, the system 200 may also include a controller 206 configured to be communicatively coupled to one or more of the system components. In general, the controller 206 may correspond to any suitable processor-based device, such as any suitable computing device. Thus, in several embodiments, the controller 206 may include one or more processor(s) 208 (FIG. 6) and associated memory device(s) 210 (FIG. 6) configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 210 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 210 may generally be configured to store suitable computer-readable instructions that, when implemented by the processor(s), configure the controller 206 to perform various functions including, but not limited to, one or more of the method elements shown in FIG. 10.

In several embodiments, the controller 206 may be communicatively coupled to the load sensor 170 to allow the controller 206 to monitor the load being applied to the tower section 40 via the plunger 142. For example, measurement signals generated by the load sensor may be transmitted to the controller 206 via a wired or wireless connection (e.g., as indicated by line 212 in FIGS. 5 and 6). The measurement signals received at the controller 206 may then be subsequently processed and/or analyzed to allow the controller 206 to actively monitor the load applied to the tower section 40. For example, the controller 206 may include a transfer function stored within its memory 210 that allows the controller 206 to convert the measurement signals provided by the load sensor 170 to a value(s) associated with the load applied to the tower section 40. In one embodiment, the determined load value may then be output by the controller 206 to the operator or user of the system 200 (e.g., by displaying the output value to the operator/user via a display device associated with the controller 206).

In another embodiment, the load value determined by the controller 206 may be used as feedback for actively controlling the linear actuation of the plunger 142. For instance, as shown in FIG. 5, the controller 206 may be communicatively coupled to the driver device 204 via a wired or wireless connection (e.g., as indicated by line 214 in FIGS. 5 and 6) so as to allow the controller 206 to electronically control the operation of the device 204. In such an embodiment, the controller 206 may, for example, be configured to transmit suitable control signals to the driver device 204 in order to regulate the torque and/or speed of the rotational output applied to the linear actuator 144 by the driver device 204, which may, in turn, impact the load being applied to the tower section 40 via the plunger 142. Thus, by actively monitoring the load applied to the tower section using the load sensor 170, the controller 206 may control or regulate the actuation of the plunger 142 in a manner that ensures that the load does not become excessive. For instance, in one embodiment, the controller 206 may compare the monitored load value(s) to a predetermined load threshold and adjust the operation of the driver device 204, as necessary or desired, so as to maintain the monitored load value(s) below the predetermined load threshold.

Additionally, as shown in FIGS. 5 and 6, the system 200 may also include one or more profile sensors 216 configured to detect one or more profile-related parameters associated with the dent 60 to be repaired. Specifically, in several embodiments, the profile sensor 216 may be configured to detect a depth 218 (FIG. 6) of the dent 60 at one or more locations (e.g., by scanning the dent 60 across its entire area to obtain a depth profile of the dent 60). As particularly shown in FIG. 6, the depth 218 may be defined as the distance between the reference line 202 forming an extension of the outer circular profile of the tower section 40 and the outer surface of the dent 60. Moreover, the profile sensor 216 may also be configured to detect any other suitable profile-related parameter associated with the dent 60 being repaired, such as the dimensions and/or surface area of the dent 60. As will be described below, the profile sensor 216 may generally correspond to any suitable sensor configured to detect a profile-related parameter associated with a dent, such as an optics-based or proximity-based profile scanner or a sensing device including both a light source and a corresponding receiver.

As shown in FIGS. 5 and 6, in several embodiments, the profile sensor 216 may be communicatively coupled to the controller 206 to allow signals generated by the sensor 216 to be transmitted to the controller 206. For example, the profile sensor 216 may be used to obtain one or more initial profile-related parameters for the dent 60 to be repaired, such as the initial maximum depth of the dent 60, the initial depth profile of the dent 60, the initial dimensions of the dent 60 and/or the initial surface area of the dent 60. Such initial profile data may then be transmitted to the controller 206 via a wired or wireless connection (e.g., as indicated by line 220 in FIGS. 5 and 6) to allow the controller 206 to develop a pushing strategy and/or determine one or more suitable parameters for repairing the subject dent 60. For example, in one embodiment, the controller 206 may include a transfer function, look-up table and/or any other suitable correction means stored within its memory 210 that utilizes the initial profile data associated with the dent 60 (e.g., the depth 218 of the dent 60) along with one or more structural parameters associated with the tower section 40 (e.g., a thickness 222 (FIG. 6) of the tower section 40 and/or the properties of the material used to form the tower section 40) to determine a maximum load value or threshold to be used when repairing the tower section 40. Thus, by knowing the tower-related parameter(s) and by receiving the initial profile data from the profile sensor 216, the controller 206 may be configured to determine the maximum load to be applied to the tower section 40 during the dent repair process. This predetermined load threshold may then be subsequently compared to the load measurements provided by the load sensor 170 as the controller 206 is being used to actively control the actuation of the plunger 142 (e.g., via direct control of the driver device 204).

In addition, the profile data received from the profile sensor 216 may also be used by the controller 206 as direct feedback for actively controlling the actuation of the plunger 142. For instance, the profile sensor 216 may be configured to continuously or periodically obtain updated profile data associated with the depth 218 of the dent 60 as the dent 60 is being pushed outwardly via actuation of the plunger 142. Such information may then be used by the controller 206 to actively adjust the operation of the driver device 204 so as to ensure that the dent 60 is not pushed outwardly beyond the outer profile of the tower section 40 (e.g., beyond the reference line 202). For instance, as the depth 218 of the dent 60 is decreased, the controller 206 may be configured to reduce the toque and/or speed of the rotational output applied to the linear actuator 144 by the driver device 204, thereby reducing the linear actuation rate of the plunger 142. Similarly, by actively monitoring the depth 218 of the dent 60 relative to the reference line 202, the controller 206 may determine when the depth 218 has been reduced to zero (or to a level below a minimum depth threshold) such that it may be assumed that the dent 60 has been pushed outwardly into alignment with the remainder of the outer surface 50 of the tower section 40. In such instance, the controller 206 may be configured to halt or stop the operation of the driver device 204, thereby preventing further actuation of the plunger 142 against the tower section 40.

It should be appreciated that, as an alternative to using the profile data received from the profile sensor 216 as feedback for actively controlling the actuation of the plunger 142, the controller 206 may, instead, by configured to output such data to the operator or user of the system 200. For instance, the controller 206 may be configured to present the current depth 218 of the dent 60 to the operator/user via a display device associated with the controller 206. The operator/user may then perform suitable actions in response to the depth-related information presented on the display device, such as by manually adjusting the operation of the driver device 204.

Referring now to FIGS. 7 and 8, one embodiment of a suitable sensor assembly 250 that may be used in combination with the profile sensor 216 described above for capturing profile data associated with the dent 60 being repaired is illustrated in accordance with aspects of the present subject matter. Specifically, FIG. 7 illustrates the sensor assembly 250 installed on the exterior of the tower section 40 shown in FIG. 2. Additionally, FIG. 8 illustrates a cross-sectional view of the sensor assembly 250 shown in FIG. 7 taken about line 8-8.

In general, the sensor assembly 250 may include one or more components configured to support the profile sensor 216 along the exterior of the tower section 40 at a location at and/or adjacent to the dent 60. Specifically, in several embodiments, such components may be configured to serve as tracks or guides that allow the profile sensor 216 to be scanned or otherwise moved along the exterior of the dent 60 in order to obtain profile data across entire area of the dent 60. For example, as shown in FIG. 7, the sensor assembly 250 may include first and second guide rails 252, 254 extending lengthwise along either side of the dent 60 in a first direction (e.g., as indicated by arrow 256) and a crosswise guide rail 258 extending perpendicularly between the first and second guide rails 252, 254 in a second direction (e.g., as indicated by arrow 260). Additionally, the sensor assembly 250 may also include first and second support members 262, 264 mounted on the first and second guide rails 252, 254, respectively, that are configured to support the crosswise guide rail 258 at a location radially outwardly from the outer surface 50 of the tower section 40 and a crosswise support member 266 mounted on the crosswise guide rail 258 that is configured to support the profile sensor 216 relative to the dent 60.

In several embodiments, the support members 262, 264, 266 may be configured to slide or otherwise move relative to their corresponding guide rails 252, 254, 258 to allow the profile sensor 216 to be scanned across the entire area of the dent 60. Specifically, the first and second support members 262, 264 may configured to move along the length of the first and second guide rails 252, 254 to allow the position of the profile sensor 216 to be adjusted in the first direction 256. Similarly, the crosswise support member 266 may be configured to move along the length of the crosswise guide rail 258 to allow the position of the profile sensor 216 to be adjusted in the second direction 260. Thus, by using the guide rails 252, 254, 258 and support members 262, 264, 266 to adjust the position of the profile sensor 216 along the first and second directions 256, 260, the profile sensor 216 may be scanned across the entirety of the dent 260, thereby allowing detailed, profile-related information to be obtained by the sensor 216. For instance, as shown in FIG. 8, the profile sensor 216 may be scanned across the dent 60 in the second direction 260 to allow the depth 218 of the dent 60 to be detected at a plurality of differing locations along a crosswise dimension 268 of the dent 60. Similarly, as shown in FIG. 7, the profile sensor 216 may be scanned across the dent 60 in the first direction 256 to allow the depth 218 of the dent 60 to be detected at a plurality of differing locations along a lengthwise dimension 270 of the dent 60.

It should be appreciated that, in the embodiment shown in FIGS. 7 and 8, the first and second guide rails 252, 254 may be coupled to the tower section 40 using any suitable means. For instance, in one embodiment, the first and second guide rails 252, 254 may be coupled to the tower section 40 via magnets. In another embodiment, the guide rails 252, 254 may be coupled to the tower section 40 using an adhesive(s) and/or suitable mechanical fasteners.

It should also be appreciated that, in several embodiments, the position of the profile sensor 216 may be configured to be automatically adjusted along the first and/or second directions 256, 260. For instance, each support member 262, 264, 266 may be provided in operative association with a motor or other suitable actuator or movement device that allows the position of the support member relative to its corresponding guide rail 252, 254, 258 to be electronically controlled. In such an embodiment, the movement of the support members 262, 264, 266 may be controlled (e.g., via the controller 206) such that the profile sensor 216 is automatically scanned across the entire area of the dent 60. Alternatively, the movement of the support members 262, 264, 266 may be manually controlled to allow the profile sensor 216 to be scanned across the entire area of the dent 60.

As indicated above, the profile sensor 216 may generally correspond to any suitable sensor and/or sensing device that is configured to detect data associated with a profile-related parameter(s) of the dent 60 to be repaired. For instance, in several embodiments, the profile sensor 216 may correspond to an optical sensor, such as a camera, laser sensor and/or other optics-based sensor, configured to detect the depth 218 and/or other profile-related parameters of the dent 60 based on images acquired of the dent 60 and/or based on light reflected off of the outer surface of the dent 60. In other embodiments, the profile sensor 216 may correspond to a non-optics-based sensor, such as an inductive, capacitive and/or magnetic-based proximity sensor. For instance, as shown in FIG. 8, the profile sensor 216 may be aligned with the reference line 202 defining the outer circular profile of the tower section 40. As such, by detecting the proximity of the outer surface of the dent 60 relative to the sensor 216, the profile sensor 216 may detect the depth 218 of the dent 60 as defined relative to the reference line 202.

By utilizing the sensor assembly 250 shown in FIGS. 7 and 8, a complete scan of the dent 60 to be repaired may be performed before and/or during the repair process. For instance, as an initial step, the profile sensor 216 may be scanned across the dent 60 to allow pre-repair or initial profile data to be obtained for the dent 60. As indicated above, such initial data may then be transmitted to the controller 206 for subsequent processing and/or analysis (e.g., by using the initial profile data along with tower-related data to determine a predetermined load threshold to be used during the subsequent repair process). Additionally, the profile sensor 216 may also be scanned across the dent 60 periodically during the repair process to obtain updated profile data for the dent 60. For example, in one embodiment, the actuation of the plunger 142 may be periodically stopped to allow the profile sensor 216 to obtain updated depth values for the dent 60, which may then be used to adjust the operation of the driver device 204, as necessary or desired. Alternatively, the profile sensor 216 may be used to obtain updated profile data for the dent 60 simultaneously with the plunger 142 being actuated against the tower section 40.

Referring now to FIG. 9, a similar cross-sectional view of the tower section 40 shown in FIG. 8 is illustrated in accordance with aspects of the present subject matter, particularly illustrating a different embodiment of a profile sensor 216A that may be used to provide profile-related data or feedback during the dent repair process. Specifically, as shown in FIG. 9, the profile sensor 216A may include a light source 280 (e.g., a laser) and a light target or receiver 282 positioned relative to the light source 280 such that the receiver 282 is configured to receive light from the light source 280 when an unobstructed light path is defined between the light source 280 and the receiver 282. In one embodiment (as indicated by the solid lines in FIG. 9), the light source 208 and corresponding receiver 282 may be mounted on the exterior surface 50 of the tower section 40 along opposed sides or ends of the dent 60 such that a light path (indicated by dashed line 284) is defined between the light source 280 and the receiver 282 that generally forms an extension of the outer circular profile of the tower section 40 (e.g., by being aligned with the reference line 202 shown in FIGS. 5 and 6). In such an embodiment, the profile sensor 216A may be used to provide an indication of when the dent 60 has been pushed outwardly a sufficient amount so as to be aligned with the outer profile of the tower section 40. Specifically, the dent 60 may be pushed outwardly until the outer surface of the dent 60 is aligned with and/or begins to obstruct the light path 284 defined between the light source 280 and the receiver 282.

In another embodiment (as indicated by the dashed lines in FIG. 9), the light source 280 and corresponding receiver 282 may be mounted on the interior surface 52 of the tower section 40 along opposed sides or ends of the dent 60 such that a light path (indicated by dashed line 286) is defined between the light source 280 and the receiver 282 that generally forms an extension of the inner circular profile of the tower section 40. In such an embodiment, the profile sensor 216A may be used provide an indication of when the dent 60 has been pushed outwardly a sufficient amount so as to be aligned with the inner profile of the tower section 40. Specifically, the dent 60 may be pushed outwardly until the inner surface of the dent 60 is aligned with and/or extends slightly beyond the light path 286 defined between the light source 280 and the receiver 282.

It should be appreciated that, in one embodiment, the light source/receiver 280, 282 may be used to provide the operator or user of the system 200 with a visual indicator as to the status of the dent repair. Alternatively, the receiver 282 may be communicatively coupled to the controller 206 such that the profile sensor 216A is able to provide an indication to the controller 206 of the status of the dent repair. For example, for the externally mounted light source/receiver 280, 282, the receiver 282 may be configured to transmit a suitable signal to the controller 206 when the light path 284 becomes obstructed, thereby providing an indication that the dent 60 has been pushed outwardly a sufficient amount relative to the outer profile of the tower section 40. Similarly, for the internally mounted light source/receiver 280, 282, the receiver 282 may be configured to transmit a suitable signal to the controller 206 when the light path 286 becomes unobstructed, thereby providing an indication that the dent 60 has been pushed outwardly a sufficient amount relative to the inner profile of the tower section 40.

Additionally, it should be appreciated that, in other embodiments, the light source/receiver 280, 282 may be replaced with any other suitable sensing device and/or sensing means that provides an indication of the status of the dent repair based on the profile of the dent 60 relative to the inner and/or outer profile(s) of the tower section 40. For instance, in one embodiment, the profile sensor 216A may correspond to one or more elongated threads or other thread-like members configured to span across the width of the dent 60, such as by taping the ends of each thread to the exterior surface 50 of the tower section 40 along either side of the dent 60. In such an embodiment, when the outer surface of the dent 60 becomes aligned with and/or contacts the thread(s), the operator or user of the system 200 may be provided with a visual indication that the dent 60 has been pushed sufficiently outwardly.

Referring now to FIG. 10, a flow diagram of one embodiment of a method 300 for repairing dents in a tower section of a wind turbine tower is illustrated in accordance with aspects of the present subject matter. In general, the implementation of the method 300 will be described herein with reference to the system 200 shown in FIGS. 5 and 6, particularly with reference to the embodiments of the system 200 that utilize the controller 206 to actively control the actuation of the plunger 142. However, it should be appreciated that, in other embodiments, the disclosed method 300 may be implemented in any other manner consistent with the description provided herein. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 10, at (302), the method 300 may include installing a dent repair tool within the tower section including the dent to be repaired. As indicated above, the dent repair tool 100 may be installed within the tower section 40 by initially adjusting the lengths of each arm 104, 106, 108 such that the radially outer ends 116 of the arms 104, 106, 108 contact the inner surface 52 of the tower section 40. For example, the length of the arm base 140 of the actuator arm 104 may be adjusted until the plunger 142 of the actuator arm 104 contacts or otherwise engages the inner surface 52 of the tower section 40 at a location at or adjacent to the dent 60. Similarly, the length of the arm base 122 of each support arm 106, 108 may be adjusted until each respective support plunger 124 contacts or otherwise engages the inner surface 52 of the tower section 40 at a location spaced apart circumferentially from the location of the dent 60.

Additionally, at (304), the method 300 may include receiving initial profile data associated with at least one profile-related parameter for the dent. As indicated above, the controller 206 may be configured to receive initial profile data from a suitable profile sensor, such as the profile sensor 216 shown in FIGS. 5 and 6. For instance, in one embodiment, the profile sensor 216 may be scanned across the entire area of the dent 60 using the sensor assembly 250 shown in FIGS. 7 and 8 to allow initial profile data (e.g., an initial depth value and/or an initial depth profile) to be obtained by the sensor 216 and subsequently transmitted to the controller 206. Alternatively, the initial profile data may be input into the controller 206 by an operator or user of the disclosed system 200 (e.g., using a keyboard or other suitable input device coupled to the controller 206) or from a separate computing device.

Moreover, at (306), the method 300 may include determining a load threshold for repairing the dent based on the initial profile data. For instance, in several embodiments, the controller 206 may be configured to determine a load threshold to be used when repairing the dent 60 that corresponds to the maximum load to be applied against the tower section 40 as the dent 60 is being pushed outwardly. Specifically, as indicated above, the controller 206 may include a transfer function, look-up table and/or any other suitable correlation means stored within its memory 210 that utilizes the initial profile data and one or more tower-related parameters (e.g., the thickness 222 of the tower section 40 and/or the material properties of the tower section 40) to determine a maximum load to be applied to the tower section 40. In such an embodiment, the tower-related parameter(s) used by the controller 206 to determine the load threshold may be pre-stored within its memory 210, input by the operator or user of the system 200 and/or received from a separate computing device.

Referring still to FIG. 10, at (308), the method 300 includes actuating a plunger of an actuator arm of the tool such that the plunger applies a radially outward force against an inner surface of the tower section at or adjacent to the dent. As indicated above, the controller 206 may, in several embodiments, be configured to automatically control the actuation of the plunger 142. For example, the controller 206 may be configured to electronically control the operation of the driver device 204 used to drive the linear actuator 144, thereby allowing the controller 206 to indirectly control the actuation of the plunger 142.

Additionally, at (310), the method 300 includes monitoring a load associated with the radially outward force applied against the inner surface of the tower section by the plunger. For example, as indicated above, the controller 206 may be communicatively coupled to a load sensor 170 configured to detect a load associated with the force applied against the inner surface 52 of the tower section 40 as the plunger 142 is being actuated. As such, by receiving measurement signals from the sensor 170, the controller 206 may be configured to actively monitor the load being applied to the tower section 40 while the dent 60 is being pushed radially outwardly.

Moreover, at (312), the method 300 includes receiving updated profile data associated with the profile-related parameter(s) for the dent. Specifically, as indicated above, the controller 206 may be configured to periodically or continuously receive updated profile data from the profile sensor 216 that is associated with any suitable profile-related parameter for the dent 60. For example, after initially pushing the dent 60 outwardly a given amount, the profile sensor 216 may be scanned across the dent 60 (e.g., using the sensor assembly 250 shown in FIGS. 7 and 8) to obtain updated information associated with the depth 218 of the dent 60. This updated depth information may then be transmitted to the controller 206 for subsequent processing and/or analysis.

Further, at (314), the method 300 includes controlling the actuation of the plunger based on at least one of the monitored load and/or the updated profile data. For example, as indicated above, the controller 206 may be configured to actively control the linear actuation of the plunger 142 based on the signals received from the load sensor 170. Specifically, in one embodiment, the controller 206 may compare the actual load being applied to the tower section 40 (e.g., as derived from the signals transmitted by the load sensor 170) to the load threshold previously determined by the controller 206. If the actual load exceeds the predetermined load threshold, the controller 206 may be configured to actively control the actuation of the plunger 142 in a manner that reduces the load to a level at or below the predetermined load threshold. For example, the controller 206 may be configured to actively adjust the operation of the driver device 204 in a manner that reduces torque and/or speed of the rotational output being applied to the linear actuator 144, thereby reducing the load being applied against the tower section 40 by the plunger 142.

Moreover, as indicated above, the controller 206 may similarly be configured to actively control the linear actuation of the plunger 142 based on the updated profile data received from the profile sensor 216. For example, as the depth 218 of the dent 60 is decreased, the controller 206 may adjust the manner in which the plunger 142 is being actuated, such as by reducing the torque and/or speed of the rotational output being applied to the linear actuator 144 by the driver device 204. Additionally, by actively monitoring the depth 218 of the dent 60 relative to the reference line 202 defining the outer circular profile of the tower section 40, the controller 206 may determine when the depth 218 has been reduced to zero (or to a level below a minimum depth threshold) such that it may be assumed that the dent 60 has been pushed outwardly into alignment with the remainder of the outer surface 50 of the tower section 40. In such instance, the controller 206 may be configured to halt or stop the operation of the driver device 204, thereby preventing further actuation of the plunger 142 against the tower section 40.

It should be appreciated that the method 300 may also include various other method elements consistent with the description provided herein. For example, the method 300 may include orienting the plunger 142 of the actuator arm 104 relative to the dent 60 formed in the tower section 40. For example, the plunger 142 may be oriented relative to the dent 60 by aligning the plunger 142 circumferentially with the dent 50 and/or by rotating the plunger 142 relative to the lengthwise direction of the actuator arm 104 to adjust the orientation of the plunger 142 relative to the dent 60.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for repairing dents in a tower section of a wind turbine tower, the tower section including a radially inner surface and a radially outer surface, the system comprising:
    a dent repair tool configured to be installed within the tower section, the tool including a tool hub and a plurality of arms configured to extend radially outwardly from the tool hub towards the radially inner surface of the tower section, the tool further comprising a linear actuator provided in operative association with an actuator arm of the plurality of arms, the linear actuator being configured to linearly actuate a plunger of the actuator arm relative to the tool hub such that the plunger applies a radially outward force against the radially inner surface of the tower section at or adjacent to a location of a dent formed in the tower section;
    a load sensor configured to provide an indication of a load associated with the radially outward force applied against the radially inner surface of the tower section by the plunger;
    a controller configured to monitor the load based on signals received from the load sensor; and
    a profile sensor disposed along an exterior of the tower section radially outwardly from the radially outer surface of the tower section, wherein the profile sensor provides an indication of a depth of the dent relative to a reference line forming an extension of an outer circular profile defined by the radially outer surface of the tower section as the plunger is being actuated, the controller being communicatively coupled to the profile sensor such that the controller actively monitors the depth of the dent relative to the reference line during dent removal operations,
    wherein the controller actively controls the linear actuation of the plunger based at least in part on the indications of depth obtained from the profile sensor during dent removal operations.

2. The system of claim 1, wherein the linear actuator is configured to convert rotational motion into linear actuation of the plunger.

3. The system of claim 2, wherein the linear actuator comprises a threaded rod and a threaded nut configured to engage the threaded rod, wherein, when the threaded nut is rotated, the threaded rod is configured to linearly actuate the plunger.

4. The system of claim 2, further comprising a driver device configured to rotationally drive the linear actuator, the controller being configured to control the operation of the driver device so as to control the linear actuation of the plunger.

5. The system of claim 1, wherein the controller is further configured to control the linear actuation of the plunger based on the monitored load.

6. The system of claim 5, wherein the controller is configured to compare the monitored load to a predetermined load threshold associated with repairing the dent, the controller being configured to control the linear actuation of the plunger such that the monitored load does not exceed the predetermined load threshold.

7. The system of claim 1, wherein the profile sensor is configured to provide a periodic indication of the depth of the dent as the plunger is being actuated.

8. The system of claim 1, wherein the profile sensor comprises one of a camera or a laser sensor.

9. The system of claim 1, wherein the profile sensor forms part of a sensor assembly installed in contact with the exterior of the tower section, the sensor assembly including at least one guide rail configured to support the profile sensor relative to the radially outer surface of the tower section.

10. The system of claim 9, wherein the profile sensor is configured to be moved relative to the at least one guide rail to allow the profile sensor to be scanned across a location of the dent.

11. A system for repairing dents in a tower section of a wind turbine, the tower section including a radially inner surface and a radially outer surface, the system comprising:
a dent repair tool configured to perform a dent removal operation, the dent repair tool comprising:
a tool hub;
first and second support arms coupled to the tool hub so as to extend radially outwardly therefrom;
an actuator arm configured to extend radially outwardly from the tool hub between a first end and a second end, the actuator arm including an arm base coupled to the tool hub at the first end and a plunger disposed at the second end, the actuator arm further including a linear actuator coupled between the arm base and the plunger,
wherein, when the tool is installed within the tower section, the linear actuator is configured to linearly actuate the plunger relative to the tool hub such that the plunger applies a radially outwardly force against the radially inner surface of the tower section at or adjacent to a location of a dent formed in the tower section, and
a profile sensor configured to provide an indication of a status of the dent removal operation, the profile sensor comprising:
a light source coupled to the tower section adjacent the dent, and
a receiver coupled to the tower section adjacent the dent and positioned relative to the light source such that the receiver receives light from the light source when an unobstructed light path is defined between the light source and the receiver,
wherein actuation of the plunger is controlled based on whether the unobstructed light path is defined between the light source and the receiver.

12. The system of claim 11, wherein the linear actuator is configured to convert rotational motion into linear actuation of the plunger.

13. The system of claim 12, wherein the linear actuator comprises a threaded rod and a threaded nut configured to engage the threaded rod, wherein, when the threaded nut is rotated, the threaded rod is configured to linearly actuate the plunger.

14. The system of claim 11, further comprising a load sensor provided in operative association with the actuator al in, the load sensor being configured to provide an indication of a load associated with the radially outward force applied against the radially inner surface of the tower section by the plunger.

15. The system of claim 11, wherein the first and second support arms and the actuator arm are each pivotally coupled to the tool hub.

16. The system of claim 11, wherein the light source and the receiver are coupled to the radially outer surface of the tower section.

17. The system of claim 11, wherein the light source and the receiver are coupled to the radially inner surface of the tower section.

18. The system of claim 11, further comprising a controller communicatively coupled to the profile sensor, the controller being configured to actively control the linear actuation of the plunger based at least in part on a determination of whether the unobstructed light path is defined between the light source and the receiver.

19. The system of claim 18, wherein the controller is configured to control the linear actuation of the plunger such that the plunger continues to apply the radially outwardly force against the radially inner surface of the tower section until the unobstructed light path is no longer defined between the light source and the receiver.

20. The system of claim 18, wherein the controller is configured to control the linear actuation of the plunger such that the plunger continues to apply the radially outwardly force against the radially inner surface of the tower section until the unobstructed light path is detected between the light source and the receiver.

* * * * *